United States Patent
Müller et al.

(10) Patent No.: US 10,350,821 B2
(45) Date of Patent: Jul. 16, 2019

(54) METHOD AND SYSTEM FOR MANUFACTURING A THREE-DIMENSIONAL OBJECT BY ADDITIVE MANUFACTURING

(71) Applicant: Airbus Operations GmbH, Hamburg (DE)

(72) Inventors: Markus Müller, Friedrichshafen (DE); Heike Klinger, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 551 days.

(21) Appl. No.: 14/947,753

(22) Filed: Nov. 20, 2015

(65) Prior Publication Data

US 2016/0144567 A1  May 26, 2016

(30) Foreign Application Priority Data

Nov. 21, 2014  (EP) .................................... 14194412

(51) Int. Cl.
*B29C 67/00* (2017.01)
*B29C 64/106* (2017.01)
(Continued)

(52) U.S. Cl.
CPC .......... *B29C 64/106* (2017.08); *B29C 64/112* (2017.08); *B29C 70/70* (2013.01);
(Continued)

(58) Field of Classification Search
CPC ... B29C 64/209; B29C 64/205; B29C 64/118; B29C 64/245; B29C 64/106;
(Continued)

(56) References Cited

FOREIGN PATENT DOCUMENTS

CN  1347783 A  5/2002
EP  1 911 568 A1  4/2008
(Continued)

OTHER PUBLICATIONS

ESPACENT machine-assisted English-language translation of JP 5308032 B2 (pub. Oct. 2013).*
(Continued)

*Primary Examiner* — Janis L Dote
(74) *Attorney, Agent, or Firm* — Jenkins, Wilson, Taylor & Hunt, P.A.

(57) ABSTRACT

A method, system and dispensing head for manufacturing a three-dimensional object by additive manufacturing. The three-dimensional object includes a three-dimensional component. The method provides a substrate and forming layers there-on, each layer formed in a pattern corresponding to a three-dimensional component being manufactured and each layer formed by dispensing a curable material from a nozzle of a dispensing head and subsequently curing the curable material. The three-dimensional object comprises the combination of the substrate and the three-dimensional component, wherein the substrate has a non-planar surface portion and the three-dimensional component is formed on the non-planar surface portion such that it is fixedly secured to the substrate. During forming of the layers and/or between forming of two adjacent layers a relative movement between the substrate and the dispensing head is effected such that in a substrate coordinate system the dispensing head moves along a non-linear path over the non-planar surface portion.

13 Claims, 8 Drawing Sheets

(51) Int. Cl.
*B29C 70/70* (2006.01)
*B33Y 80/00* (2015.01)
*B33Y 10/00* (2015.01)
*B33Y 30/00* (2015.01)
*B29C 64/112* (2017.01)

(52) U.S. Cl.
CPC ............... *B33Y 10/00* (2014.12); *B33Y 30/00* (2014.12); *B33Y 80/00* (2014.12)

(58) Field of Classification Search
CPC ... B29C 64/112; B29C 64/241; B29C 64/236; B29C 64/232; B29C 64/227; B29C 64/20; B29C 70/382; B29C 70/70
See application file for complete search history.

(56) References Cited

FOREIGN PATENT DOCUMENTS

| | | |
|---|---|---|
| JP | 5308032 B2 * | 10/2013 |
| WO | WO 2007/083372 A1 | 7/2007 |
| WO | WO 2013/091003 A1 | 6/2013 |

OTHER PUBLICATIONS

Extended European Search Report for Application No. 14194412.4 dated Apr. 24, 2015.
Chinese Office Action for Application No. 201510818216.3 dated Jun. 23, 2017.

* cited by examiner

METHOD AND SYSTEM FOR MANUFACTURING A THREE-DIMENSIONAL OBJECT BY ADDITIVE MANUFACTURING

CROSS-REFERENCE TO RELATED APPLICATION

This application claims priority to European Patent Application No. 14194412.4 filed Nov. 21, 2014, the entire disclosure of which is incorporated by reference herein.

TECHNICAL FIELD

The present disclosure relates to a method of manufacturing a three-dimensional object by additive manufacturing, wherein the three-dimensional object comprises a three-dimensional component, and to a corresponding system for manufacturing a three-dimensional object by additive layer manufacturing and to a dispensing head for such a system.

BACKGROUND

Additive manufacturing or additive layer manufacturing is increasingly used for rapidly manufacturing prototype or even final components and is then also referred to as rapid prototyping and rapid manufacturing, respectively. In contrast to conventional manufacturing methods involving removal of material from a block of material by, e.g., cutting, drilling or other machining processes, additive manufacturing directly constructs a desired three-dimensional object layer by layer from a digital representation of the object. It is also known as 3D printing.

One type of additive manufacturing comprises dispensing or extruding material from which the product is to be manufactured from a nozzle of a dispensing head in order to provide a thin layer of the material on a support plate, and subsequently curing or hardening the dispensed material. The material may be dispensed or extruded e.g. in the form of small beads, and hardening of the dispensed material may be effected automatically by a suitable choice of the temperature and of the material. The material is applied to the support plate only in those portions corresponding to the product being manufactured. Subsequently, a further thin layer of the material is provided in the same manner on top of the initial layer in those portions corresponding to the product being manufactured. The process is repeated until the complete object is obtained. The material, which may be a thermoplastic or metal material, may be provided to the dispensing head in the form of a wire which may be unreeled from a coil. Corresponding 3D printing machines are also referred to as 3D printing machines using wire feed technology. The dispensing head is typically adapted to heat the material inside the dispensing head above its melting temperature or a glass transition temperature, and the dispensing head is mounted to be selectively movable linearly in horizontal and vertical directions under the control of a suitable control unit in order to enable the formation of the layers.

Particular additive manufacturing methods of this type are also referred to as fused deposition modeling (FDM).

As noted above, the object is directly built up layer by layer in a three-dimensional manner. This makes it possible to efficiently and rapidly manufacture different highly complex objects from various materials, in particular plastic materials and metal materials, using one and the same apparatus. For example, highly complex grid or honeycomb structures which are difficult to produce using other techniques can be easily manufactured. As compared to traditional methods, the complexity of the object has only little influence on the manufacturing costs.

Due to these advantages additive manufacturing methods of the above type find increasing application in various fields of technology, such as aircraft and automotive engineering. Amongst others, components, such as mounting brackets, are manufactured by additive manufacturing which must be later secured to other components, such as cables or ducts. It has turned out to be generally difficult or impossible to directly manufacture components by additive manufacturing on other components such that they are secured to each other. Thus, when manufacturing, for example, a mounting bracket it is necessary to secure the mounting bracket to the component to be mounted by the mounted bracket in a separate process step.

SUMMARY

It is therefore an object of the present disclosure to provide a simple, rapid and cost efficient method for manufacturing a three-dimensional object by or using additive manufacturing, wherein the three-dimensional object comprises a three-dimensional component or portion, which is formed by additive manufacturing directly on a separate component or portion belonging to the three-dimensional object such that the two components are attached to each other. It is a further object of the present disclosure to provide a dispensing head and a system for carrying out such method.

This object is achieved, at least in whole or in part, by a method having the features disclosed herein. Advantageous embodiments of the method, of the dispensing head and of the system are disclosed herein.

According to the present disclosure a method of manufacturing a three-dimensional object by or using additive manufacturing comprises—in accordance with the prior art methods described above-successively providing a plurality of layers of material extruded from a nozzle of a dispensing head, one on top of the other, on a substrate, wherein each layer is formed in a pattern corresponding to a three-dimensional component of the three-dimensional object being manufactured. The material is curable or capable of hardening, and each layer is cured or hardened following its application onto the substrate or the preceding layer. Thus, the method generally comprises providing the substrate and then successively forming the plurality of layers on the substrate in the manner described. For these purposes a 3D printing system using wire feed technology mentioned above may be utilized. It is noted that the nozzle may preferably have a nozzle opening which has different dimensions in two perpendicular directions or is elongate, so that the portion of material just being extruded from the nozzle has a corresponding cross-section shape. For example, the nozzle opening and the portion of material just being extruded from the nozzle may be rectangular with or without rounded corners. By such a nozzle configuration it is advantageously possible to cover a larger area of the substrate or the preceding layer with one nozzle movement.

Importantly, the three-dimensional object is constituted by the combination of the substrate and the three-dimensional component, and the substrate is provided as a finished component prior to beginning providing the plurality of layers to form the three-dimensional component. In other words, the substrate is an inlayed part and is not manufactured by the additive manufacturing step or is manufactured entirely separately in a separate additive manufacturing process. Consequently, the three-dimensional object is not or must not be manufactured in its entirety by additive manufacturing, but only a portion thereof is actually formed by additive manufacturing, namely the three-dimensional component thereof. In other words, the method can also be referred to as a method for manufacturing a combination of a three-dimensional component and a separate component or inlayed part, which is provided by the substrate, wherein the three-dimensional component is attached to the substrate and is manufactured by additive manufacturing or 3D printing.

The substrate has a non-planar surface portion. The non-planar surface portion may, e.g., be curved in its entirety or may also comprise two or more planar sub-portions which are oriented at an angle with respect to each other and are interconnected by curved portions or sharp edges. The three-dimensional component is directly formed—by the additive manufacturing step—at least in part on the non-planar surface portion in such a manner that it is fixedly secured to the substrate. In order to achieve that the three-dimensional component is fixedly secured to the substrate the three-dimensional component may in particular be manufactured such that the three-dimensional surrounds the substrate in an annularly closed manner or in manner sufficiently surrounding the substrate to secure the three-dimensional component to the substrate. The three-dimensional component may be formed entirely on the non-planar surface portion or may be formed partially on the non-planar surface portion and partially on other surface portions of the substrate, in particular one or more planar surface portions.

During forming of at least one of the layers, i.e. during application of this at least one layer to the substrate or a preceding layer, and/or between forming of at least two adjacent ones of the layers a relative movement between the substrate and the dispensing head is effected such that in a substrate coordinate system the dispensing head moves along a non-linear path over the non-planar surface portion. In particular, the non-linear path may correspond to a corresponding shape of the non-planar surface portion. In any case, similar to the non-planar surface portion the non-linear path may be curved in its entirety or may also comprise two or more straight sections which are oriented at an angle with respect to each other and are interconnected by curved sections or sharp corners. For example, the non-linear path may be a curved path, such as a circular or oval path or a path having the shape of a segment of a circle.

Thus, in the substrate coordinate system the dispensing head is moved at least partially around the substrate, including the non-planar surface portion thereof. Consequently, during forming of at least one of the layers and the relative movement between the substrate and the dispensing head and/or between forming at least two adjacent ones of the layers and during the relative movement between the substrate and the dispensing head, an orientation of a dispensing direction of the nozzle, i.e. a center direction defined by the nozzle or the application direction of material ejected by the nozzle, changes in the substrate coordinate system. This has the effect that the material is applied to the substrate and in particular to the non-planar surface portion thereof from different sides of the substrate and from different directions in the substrate coordinate system.

This method provides the advantage that a three-dimensional component is formed by additive manufacturing—i.e. 3D printed—directly on a separate component without a separate step for securing the two components to each other. Therefore, a higher degree of automation and of system integration is achieved, resulting in significant cost reduction and time savings. The method may be advantageous applied in aircraft or automotive applications.

In a preferred embodiment the dispensing head is moved relative to a machine coordinate system during the relative movement between the substrate and the dispensing head. The machine coordinate system is a coordinate system of a machine in which the method is carried out and is identical to an earth coordinate system when the machine is positioned in a stationary manner on the ground.

In this embodiment or in an alternative embodiment the substrate is rotated relative to a machine coordinate system about a rotation axis during the relative movement between the substrate and the dispensing head. The machine coordinate system is preferably the same as mentioned before. For a substrate being cylindrical or comprising a cylindrical portion, a surface portion of which constitutes the non-planar surface portion, the rotation axis is preferably the longitudinal axis of the cylindrical portion. Examples of such substrates are cables or cylindrical ducts.

In a preferred embodiment the dispensing head is rotated or pivoted about a rotation or pivot axis to adapt a dispensing direction of the nozzle to the non-planar surface portion during the relative movement between the substrate and the dispensing head. In this embodiment the dispensing head is preferably mounted to a dispensing head mounting component of a dispensing head mounting arrangement, and the dispensing head mounting component is either stationary (in case only the substrate is moved relative to the machine coordinate system during the relative movement between the substrate and the dispensing head) or movable (in other cases in which the dispensing head is moved relative to the machine coordinate system during the relative movement between the substrate and the dispensing head), wherein the dispensing head is rotatably or pivotably mounted to the dispensing head mounting component, which mounting defines the rotation or pivot axis. In this embodiment or in other embodiments the dispensing direction or an orientation of the nozzle with respect to a tangent plane of the substrate at the intersection of the dispensing direction and the surface of the substrate, i.e. at the center of the region in which the nozzle applies the material, is preferably maintained within a predetermined range and is preferably constant or essentially constant. In this manner similar application conditions of the material by the nozzle can be achieved throughout the layer.

Alternatively or additionally it may be advantageous if the distance between the nozzle and the non-planar surface portion is maintained within a predetermined range during the relative movement between the substrate and the dispensing head and preferably constant or essentially constant. In this manner similar application conditions of the material by the nozzle can be achieved throughout the layer.

In a preferred embodiment the substrate is elongate and preferably has a length or longitudinal dimension which is much larger than in directions perpendicular to the longitudinal direction. Thus, in particular, the substrate may preferably have a longitudinal dimension which is larger than a corresponding maximum range of movement of the nozzle utilized, or larger than a dimension of a machine frame or interior machine space of a machine or system utilized for carrying out the method. In the latter case, during processing the substrate extends entirely through the machine space and machine frame and extends from opposite sides from the machine frame. For example, the substrate is a cable, a harness, such as a wiring harness, a duct, such as an air duct or a raiser duct, a stiffening profile or a stringer. Further, in this embodiment or in alternative preferred embodiments the three-dimensional component is preferably a bracket for attaching the three-dimensional object to another component, an attachment profile, a cleat, a stabilizer, a connecting element, or an envelope seal. It is to be noted that in any embodiment the substrate may also be dimensioned such that at least one dimension of the substrate is larger than corresponding maximum ranges of movement of the nozzle utilized.

For carrying out a method of any of the above embodiments, a particular dispensing head may be advantageously used. This dispensing head is generally of the above construction, i.e. it comprises a nozzle provided in a surface portion of the dispensing head and adapted for dispensing a curable material. It is adapted to be used in an additive manufacturing system adapted for carrying out a method according to any of the preceding claims. Different from known dispensing heads, in which the nozzle is provided centrally in or on the surface portion of the dispensing head, the nozzle is arranged offset with respect to a center of the surface portion of the dispensing head. It should be noted in this regard that in case the dispensing head comprises more than one nozzle each of these nozzles is arranged offset with respect to the center. In particular the nozzle or each nozzle is advantageously arranged at a lateral edge or border of the dispensing head.

Due this arrangement of the nozzle or nozzles it is advantageously possible to apply the material to complexly shaped features of the non-planar surface portions, such as, e.g., corners or grooves, because different from the prior art arrangement the printing head does not present an obstacle or presents less of an obstacle to moving the nozzle close to every portion of a complexly shaped non-planar surface portion. Generally, the arrangement enables the use of more complex substrates and therefore the manufacture of more complex overall designs of the three-dimensional object.

Further, a method of any of the above embodiments may be advantageously carried out using a system which comprises a substrate mounting arrangement adapted for mounting a substrate, a dispensing head comprising a nozzle adapted for dispensing a curable material onto a substrate mounted in the substrate mounting arrangement, a dispensing head mounting arrangement in which the dispensing head is mounted, and a movement mechanism adapted for effecting the relative movement between the substrate and the dispensing head as explained in detail above, i.e. the movement such that in the substrate coordinate system the dispensing head moves along a non-linear path over the non-planar surface portion during forming of at least one of the layers. The movement mechanism may comprise one or more suitable drives, such as electric motors, and preferably comprises a suitable control unit adapted for automatically controlling the drive to effect the relative movement, i.e. such that a method according to any of the preceding embodiments is carried out. The dispensing head is preferably a dispensing head as described above having on off-center nozzle.

In a preferred embodiment the dispensing head mounting arrangement comprises a guide component defining a non-linear guide path around at least a portion of a substrate mounted in the substrate mounting arrangement, and a retaining component retaining the dispensing head and mounted to the guide element to be movable in a guided manner along the non-linear guide path, wherein the retaining component comprises a first element and a second element which are movable with respect to each other to provide for movement of the dispensing head in two directions perpendicular to the non-linear guide path. In this embodiment the movement mechanism is operable to effect movement of the retaining component along the non-linear guide path and preferably also of the relative movement between the first element and the second element. Preferably, the first element is coupled between the guide component and the second element, and the second element is coupled between the first element and the dispensing head. In particular, the dispensing head is preferably mounted directly or via one or more intermediate components to the second element such that it is rotatable or pivotable with respect to the second element. In this manner, as has already been explained above, the orientation of the dispensing head and of the nozzle can be flexibly and selectively adapted to the local orientation of the non-planar surface during the relative movement between the substrate and the dispensing head. Such adaptation is also advantageously controlled by a or the control unit.

In this embodiment the guide component may be rotatable in its entirety about a rotation axis and the retaining component may be fixedly mounted spaced from the rotation axis to the guide component, and the movement mechanism is operable to effect rotation of the guide component, thereby moving the dispensing head along the non-linear guide path which is in this case defined at least partially surrounding the rotation axis. Alternatively, the guide component may comprise a rail component to which the retaining component is mounted such that it is movable along the rail component, and the movement mechanism is operable to effect movement of the retaining component along the rail component, thereby moving the dispensing head along the non-linear guide path which is in this case defined by the retaining component moving along the rail component.

In a preferred embodiment the movement mechanism and the substrate mounting arrangement are operable to effect rotation of a substrate mounted in the substrate mounting arrangement about a rotation axis.

BRIEF DESCRIPTION OF THE DRAWINGS

In the following preferred embodiments of the disclosure herein are explained in more detail with reference to the drawings.

FIG. 1b shows a top view of the system illustrated in FIG. 1a.

FIG. 3b shows another side view of the system illustrated in FIG. 3a, wherein a substrate having a different cross-sectional shape is processed as compared to FIG. 3a.

FIG. 5b shows a side view of the system illustrated in FIG. 5a.

FIG. 6b shows a side view of the system illustrated in FIG. 6a.

DETAILED DESCRIPTION

Figure 1A:
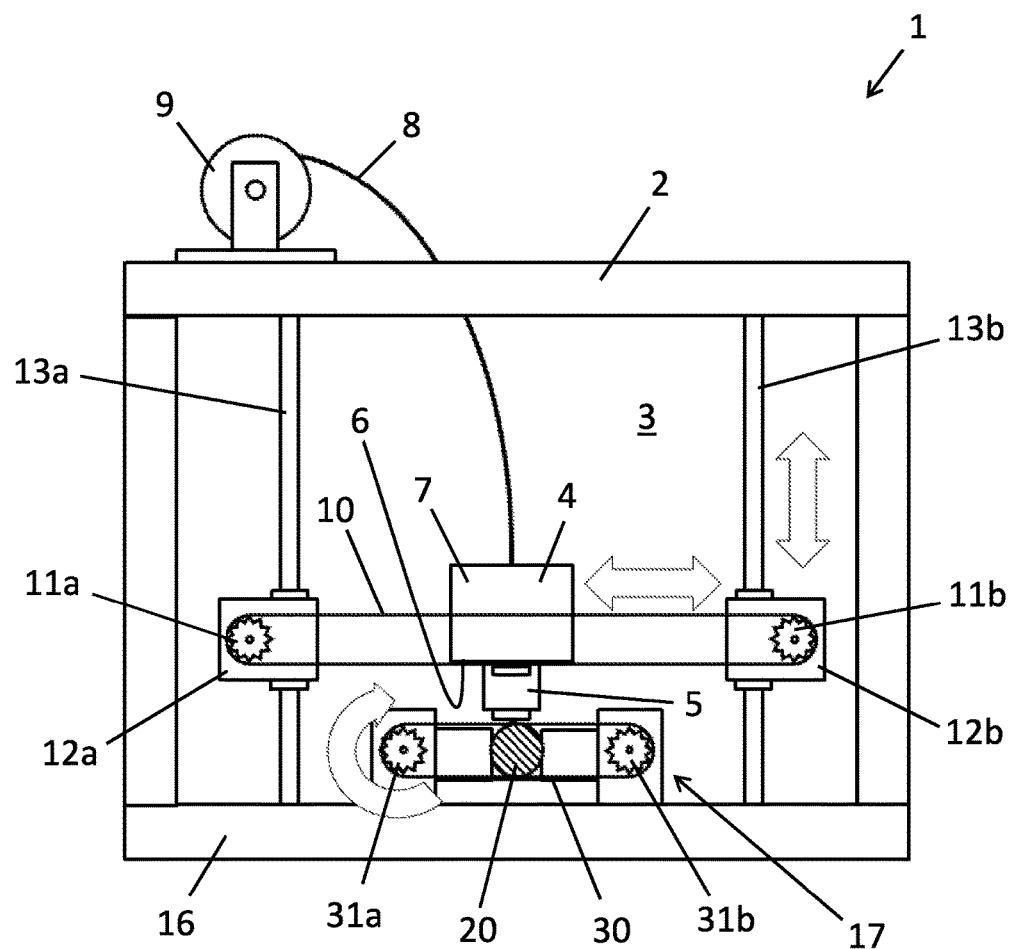
FIG. 1a shows a side view of a first embodiment of a system according to the present disclosure.
Figure 1B:
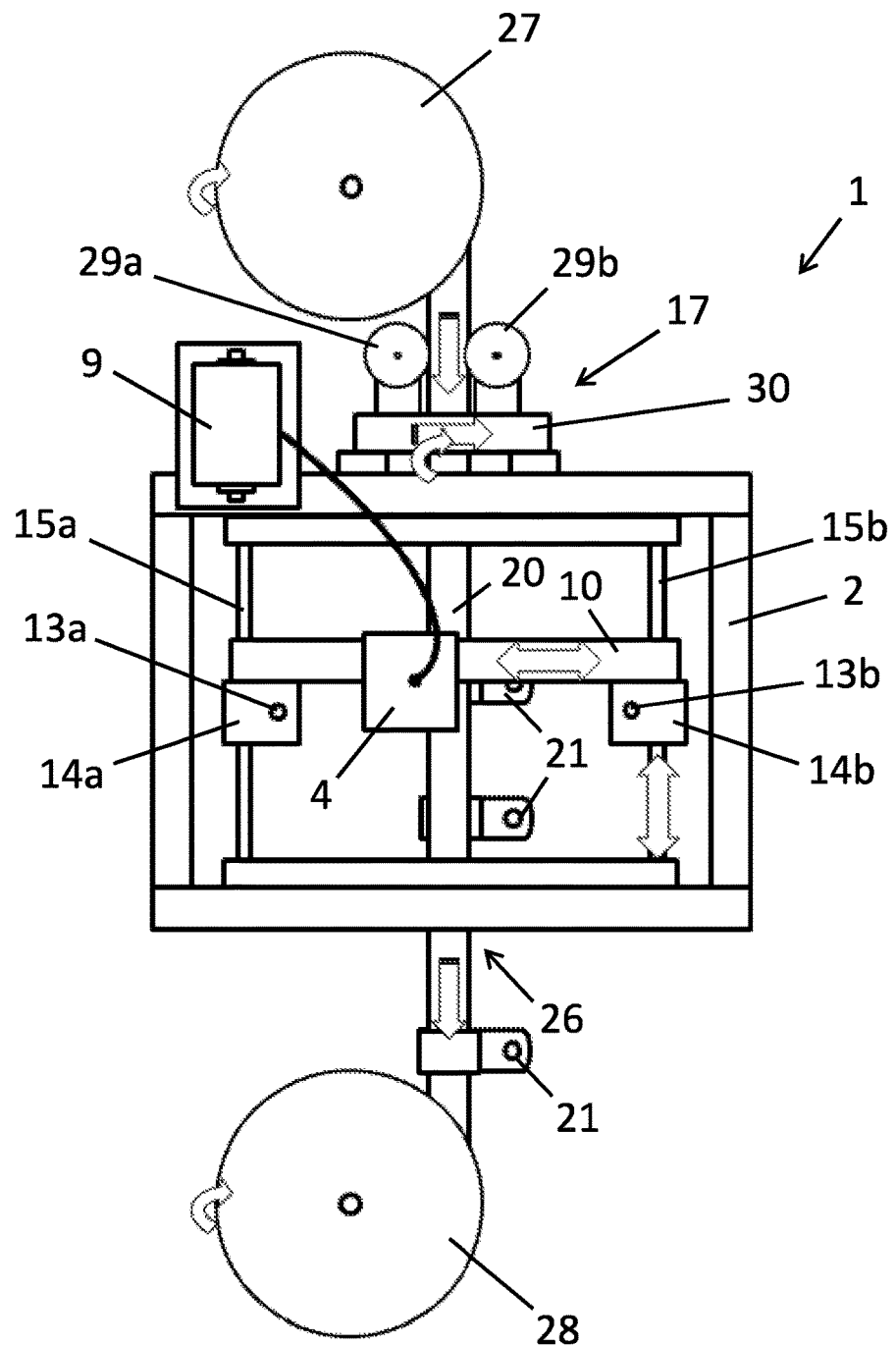

The system 1 illustrated in FIGS. 1a and 1b comprises a system or machine frame 2 which defines an interior space 3 within which a dispensing head 4 is movable supported. The dispensing head 4 comprises a nozzle 5 which projects from a rectangular surface 6 of a dispensing head body 7. Inside the body 7 a heater (not illustrated) is provided which is operable to heat thermoplastic material 8 above its glass transition temperature. The material 8 is provided to the dispensing head 4 in the form of a wire, which is wound onto and supplied from a reel 9 secured to the frame 2. Following heating above the glass transition temperature the material 8 is extruded or dispensed from the nozzle 5 in a dispensing direction defined by a center axis of the nozzle 5 or of a nozzle opening of the nozzle 5.

The dispensing head 4 is mounted to a dispensing head mounting arrangement. More specifically, it is mounted via its body 7 to an endless belt 10 which is wound around to gears 11a, 11b rotatably secured to respective gear mounting elements 12a and 12b, respectively, such that upon rotatably driving at least one of the gears 11a, 11b by a suitable electric motor provided in the respective gear mounting element 12a, 12b the body 7 and the dispensing head 4 is selectively moved to the left and right in FIGS. 1a and 1b. Each of the two gear mounting elements 12a, 12b is in turn slidably mounted to a respective straight bar 13a, 13b, which extend in parallel and spaced from each other and perpendicular to the transport direction of the endless belt 10, and a drive comprising one or more electric motors (not illustrated) is operable to synchronously and selectively move the two gear mounting elements 12a, 12b along the bars 13a, 13b in the upwards and downwards direction in FIG. 1a. Finally, as can be seen in FIG. 1b, the two bars 13a, 13b are mounted at the top and bottom ends thereof to respective bar mounting elements 14a, 14b, which are in turn slidably mounted to respective straight bars 15a, 15b, which extend in parallel and spaced from each other between opposite portions of the frame 2 in a direction perpendicular to both the transport direction of the endless belt 10 and the direction of extension of the bars 13a, 13b. A drive comprising one or more electric motors (not illustrated) is operable to synchronously and selectively move the bar mounting elements 14a, 14b along the bars 15a, 15b in the upwards and downwards direction in FIG. 1b.

Figure 2:
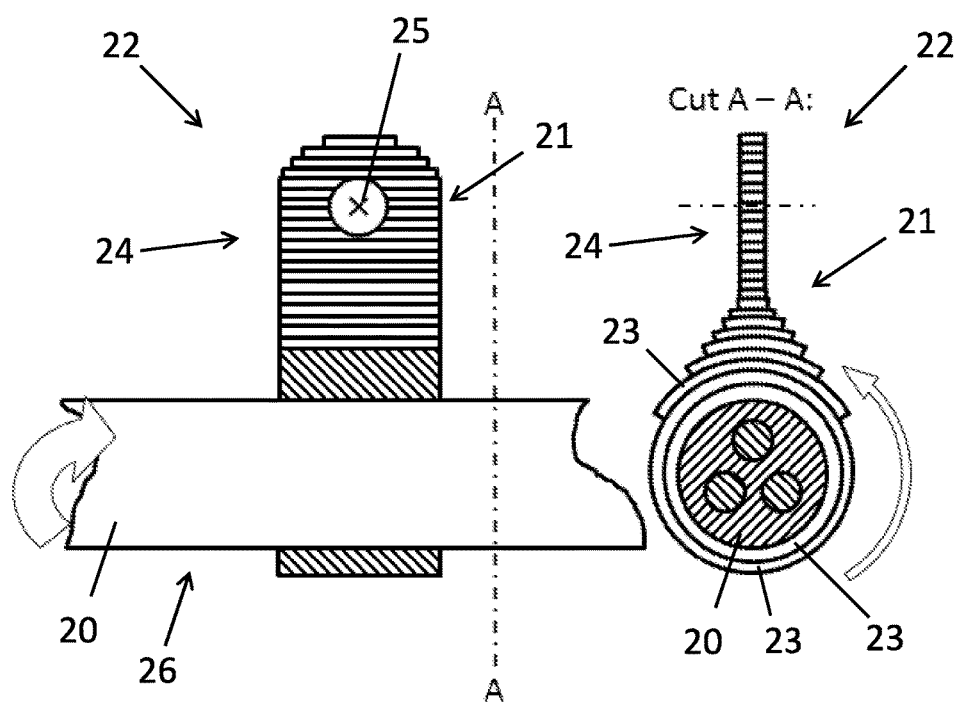
FIG. 2 shows an example of a three-dimensional object manufactured according to a method of the present disclosure.

In accordance with the principle of additive manufacturing methods utilizing a dispensing head, during operation of the system 1 the dispensing head 4 applies layer by layer material 8 to a substrate 20 in order to form a three-dimensional component 21 (see FIG. 2). According to the disclosure herein the substrate 20 is not a planar table which is merely utilized to support the three-dimensional component 21 during formation thereof, but constitutes a portion or component of a three-dimensional object 22, which comprises the substrate 20 and the three-dimensional component 21 being fixedly secured to each other. In this regard, it is also important that the layers are applied at least also to a non-planar surface portion of the substrate 20.

In the embodiment illustrated in FIGS. 1a, 1b and 2 the substrate 20 is a wire having a cylindrical cross-section, and the layers 23 are applied to the outer cylindrical surface of the wire 20. As can be seen in FIG. 2, which shows two different cross-sectional views of the finished three-dimensional object, the finished three-dimensional object constitutes an integral combination of the wire 20 and the three-dimensional component 21. More specifically, the first two layers 23 are shown to complete enclose in the circumferential direction a cylindrical portion of the wire 20, i.e. the first two layers 23 form an annularly closed portion of the three-dimensional component 21, wherein the opening defined by the annularly closed portion has a circular cross-section matching the outer shape and dimensions of the cylindrical portion of the wire 20. Following the first two layers a number of subsequent layers are applied to only partially extend around the wire 20 along the circumferential direction thereof, wherein the circumferential extension of the layers decreases from layer to layer in order to form a tapering portion of the three-dimensional component 21 immediately adjacent the annularly closed portion. Finally a plurality of layers 23 having identical dimensions are formed on the tapering portion, and the last few layers 23 are again of successively decreasing dimensions to form a rounded end portion of the three-dimensional component. It is to be noted that the number of layers indicated above and illustrated in FIG. 2 for the annularly closed portion, the tapering portion and the remainder of the three-dimensional component 21 are only exemplary. For example, the number of layers 23 completely enclosing in the circumferential direction the respective cylindrical portion of the wire 20 and forming the annularly closed portion of the three-dimensional component 21 may be smaller or larger than two, depending on the desired characteristics of the three-dimensional component 21 and of the finished three-dimensional object.

It can also be taken from FIG. 2 that the layers 23 are applied such that they have an extension or dimension in the longitudinal direction of the wire 20 which is considerably larger than the thickness of the layers 23. In order to be able to apply these layers "in a single stroke" the nozzle 5 is configured to extrude material with a corresponding elongate and in particular rectangular cross-section, as already described above.

In the embodiment shown in FIG. 2 the three-dimensional component 21 constitutes a mounting bracket which is fixedly secured to the wire 20 and comprises a mounting portion 24 in which a through-hole 25 is provided. The three-dimensional object 22 is advantageously manufactured in a single step without the need to secure a mounting bracket to a wire in a separate operating step.

In the embodiment illustrated in FIGS. 1a, 1b and 2 wire 20 is retained by a substrate mounting arrangement 17 of the system 1 during forming of the layers 23. The substrate mounting arrangement 17 is provided on or at a bottom portion 16 of the frame 2, and it is adapted to retain the wire 20 such that it extends with a straight portion 26 thereof through the interior space 3 and that it is rotatable about a longitudinal axis of that straight portion 26, which is also the longitudinal axis of the cylindrical portion on which the layers 23 are applied.

As can be seen in FIG. 1b, the wire 20 is unreeled from a first reel 27 and wound onto a second reel 28 in order to be able to selectively move the wire 20 through the interior space 3. The first and second reels 27, 28 belong to the substrate mounting arrangement 17 and are mounted such that they are pivotable or rotatable about the longitudinal axis of the straight portion 26.

The substrate mounting arrangement 17 further comprises two guide rollers 29a, 29b arranged and adapted for guiding the wire 20 when moving in the longitudinal direction, and an endless belt 30 wound around two gears 31a, 31b. The endless belt 30 extends perpendicularly with respect to the longitudinal axis of the straight portion 26 and is dimensioned such that a portion of the wire 20 extends through the loop formed by the endless belt 30, wherein two opposite inner surfaces portions of the endless belt 30 are in contact with the exterior surface of the wire 20. When driving at least one of the gears 31a, 31b by a suitable electric motor (not illustrated) the above-mentioned rotation of the wire 20 is effected due to the contact between the endless belt 30 and the wire 20 (together with the pivoting or rotation of the reels 27, 28.

Figure 6A:
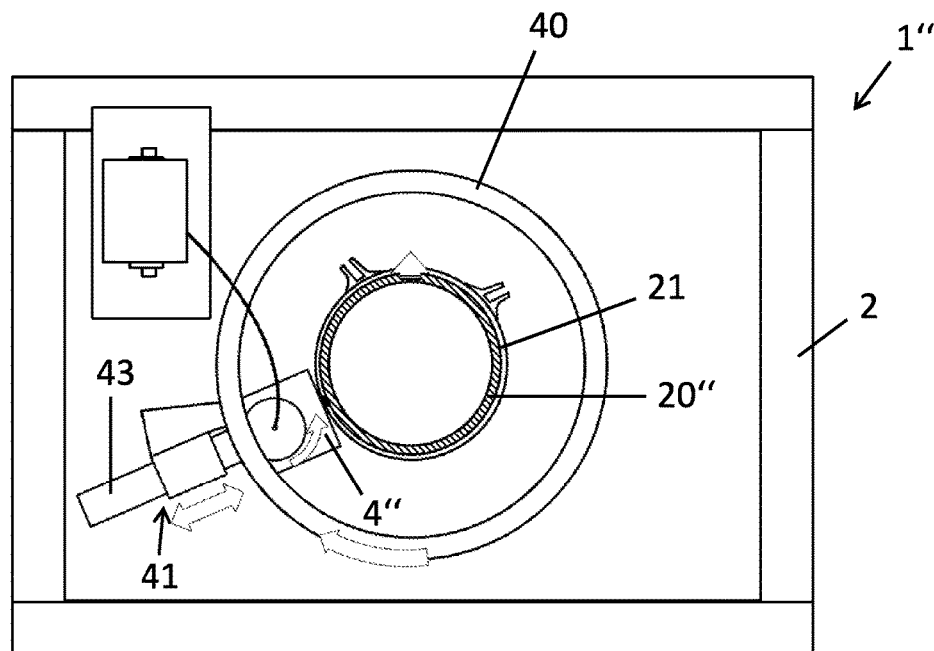
FIG. 6a shows a further top view of the third embodiment of a system according to the present disclosure.
Figure 6B:
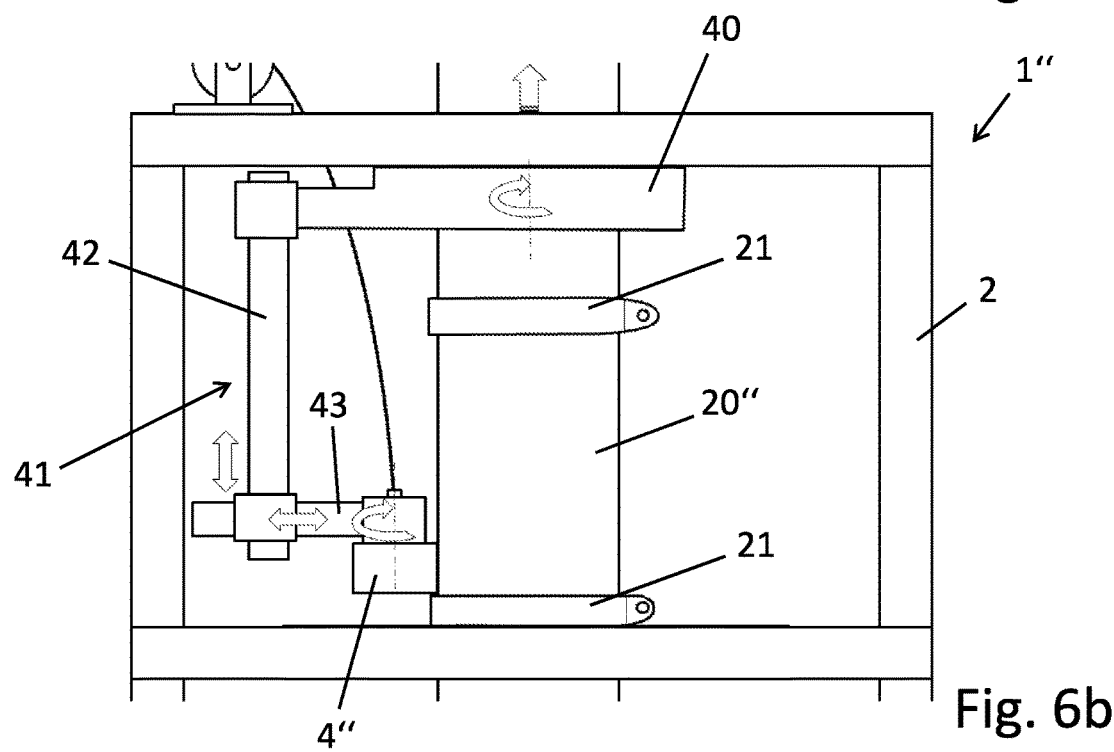

The longitudinal dimension, i.e. the length, of the wire 20 is considerably larger than the dimensions of the machine frame 2 and the interior space 3, so that the wire extends through the machine frame 2 and the interior space 3 and projects from opposite sides of the machine frame 2 (the same applies to the substrate 20" shown in FIGS. 6a and 6b).

As has been explained above, it is possible to position the nozzle 5 of the dispensing head 4 immediately above a cylindrical portion of the wire 20, and the layers 23 shown in FIG. 2 and described in detail above can be applied to that cylindrical portion by dispensing material 8 from the nozzle 5 onto the wire 20 while at the same time suitably rotating the wire 20 about the longitudinal axis. The mechanism or approach for effecting that rotation constitutes a movement mechanism adapted for effecting a relative movement between the substrate and the dispensing head which is such that during forming of at least each of the layers of the annularly closed portion and the tapering portion in a substrate coordinate system the dispensing head moves along a curved path around the cylindrical portion, wherein the distance between the nozzle 5 and the outer surface of the cylindrical portion is constant for each layer 23. In this manner, for each of these layers 23 the material 8 is applied to the wire 20 from varying directions with a constant orientation of the dispensing direction of the nozzle 5 with respect to the surface of the wire 20.

As shown in FIG. 1b, two mounting brackets 21 have already been applied to the wire 20, and the wire 20 has been moved a certain distance along the longitudinal direction to position another cylindrical portion of the wire 20 below the dispensing head 4 for forming a third mounting bracket 21. Thus, it can be seen that the wire 20 or another substrate may be advantageously be moved through the machine frame 2 and the interior space 3 during formation of a single three-dimensional component or between the formation of multiple three-dimensional components.

Figure 3A:
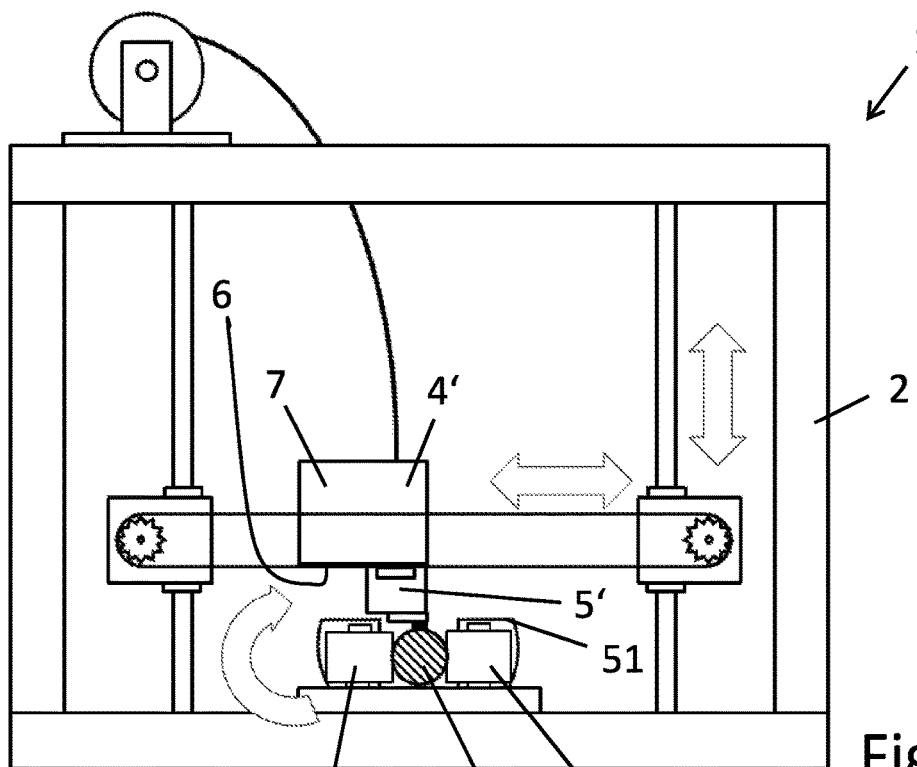
FIG. 3a shows a side view of a second embodiment of a system according to the present disclosure.
Figure 3B:
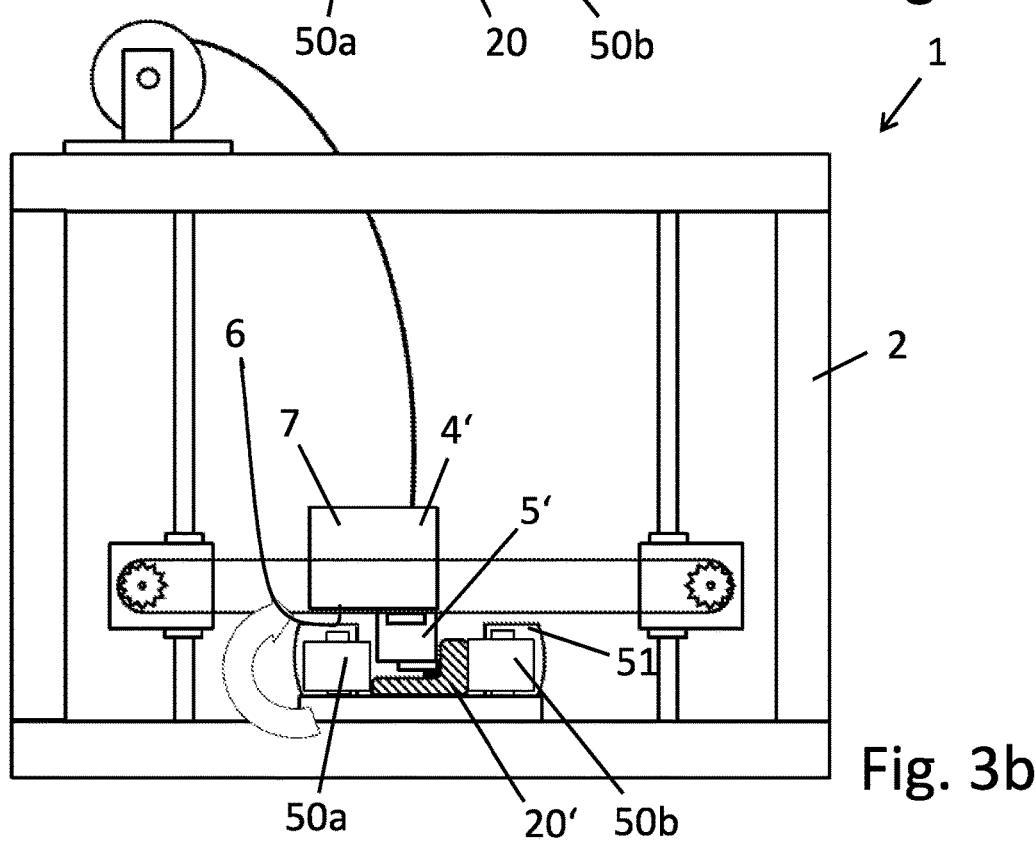

FIGS. 3a and 3b show two modifications of the embodiment of FIGS. 1a and 1b. One modification relates to the dispensing head. The dispensing head 4' of both FIGS. 3a and 3b generally corresponds to the dispensing head 4 of FIGS. 1a and 1b. However, as can be seen in the FIGS. the nozzle 5' and its-elongate or rectangular-outlet are arranged at an outer edge or border of the surface 6 of the body 7 of the dispensing head 4', rather than in the center as in the case of FIGS. 1a and 1b.

The other modification relates to the arrangement for retaining and rotating the substrate allowing the substrate to have various complex cross-sectional shapes.

Figure 4:
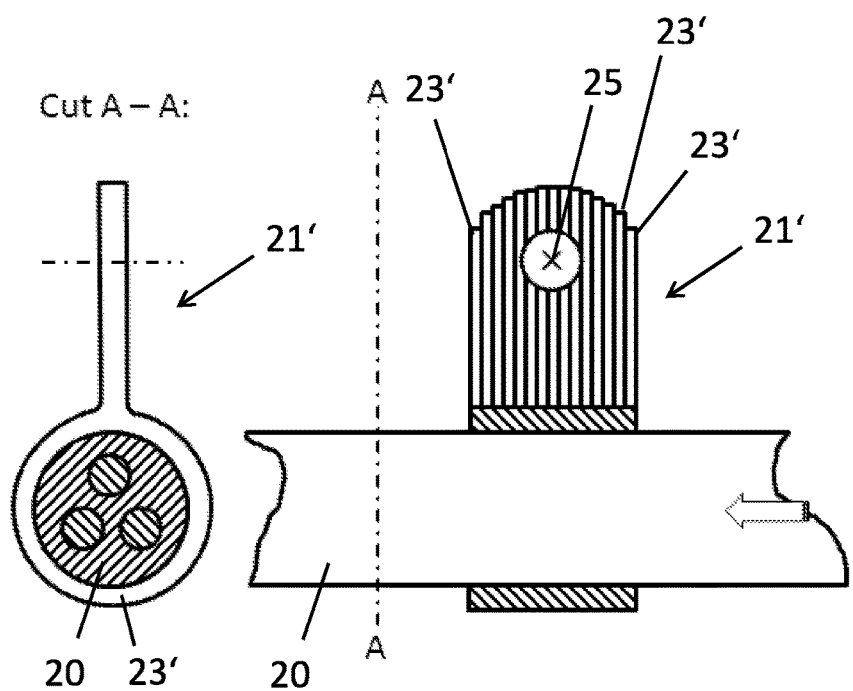
FIG. 4 shows another example of a three-dimensional object manufactured according to a method of the present disclosure.

In FIG. 3a the dispensing head 4' is utilized together with a wire 20 as substrate as in the case of the embodiment shown in FIGS. 1a, 1b and 2. The arrangement of the nozzle 5' together with a rotated printing plane of the nozzle 5'—i.e. the plane defined by the elongate or rectangular nozzle outlet and the extrusion direction—as compared to the nozzle 5 of FIGS. 1a and 1b advantageously allow to follow the cable 20 layer 23' by layer 23' in the longitudinal direction of the cylindrical portion in order to form a mounting bracket 21 having a generally similar outer shape as the one illustrated in FIG. 2 (see FIG. 4). In this regard it is noted that this particular arrangement and orientation of the layers 23' shown in FIG. 4 is made possible by the particular configuration and the orientation of the dispensing head 4' and the nozzle 5' described above. It is further noted that the different layer arrangements and orientations utilized in FIGS. 2 and 4 allow for different characteristics and outer shapes of the three-dimensional component. For example, the layer arrangement and orientation utilized in FIG. 2 allows to easily provide the tapered portion. Thus, it can be seen that depending on the desired characteristics and outer shape a particular layer arrangement and orientation and in particular those illustrated in FIGS. 2 and 4 can be selectively chosen.

In FIG. 3b the dispensing head 4' is utilized together with a substrate 20' having a non-planar surface portion including a curved portion and a corner. As can be seen in FIG. 3b the arrangement of the nozzle 5' advantageously allows for forming a three-dimensional component on a substrate 20' having such complex surface features.

Different the embodiment of FIGS. 1a and 2b, in which the wire 20 is contacted and rotated by the endless belt 30, in FIGS. 3a and 3b the substrate 20, 20' is contacted on opposite sides by two pressure rollers 50a, 50b which are secured to and carried by a support structure 51 to be rotatable about parallel axes extending perpendicularly to the longitudinal direction of the respective substrate 20, 20'. Each of the pressure rollers 50a, 50b is biased towards the substrate 20, 20' so that the two pressure rollers 50a, 50b lamp the substrate 20, 20' between them and are capable of clamping substrates of different cross-sectional shapes and dimensions. Thus, by rotating the support structure 51 about an axis aligned with the longitudinal axis of the substrate 20, 20' the substrate 20, 20' is rotated as in the case of FIGS. 1a and 1b. Furthermore, if the pressure rollers 50a, 50b are constructed to be driven by a suitable drive, they are at the same time operable to transport the substrate 20, 20' in the longitudinal direction or at least to assist in such transport.

Figure 5A:
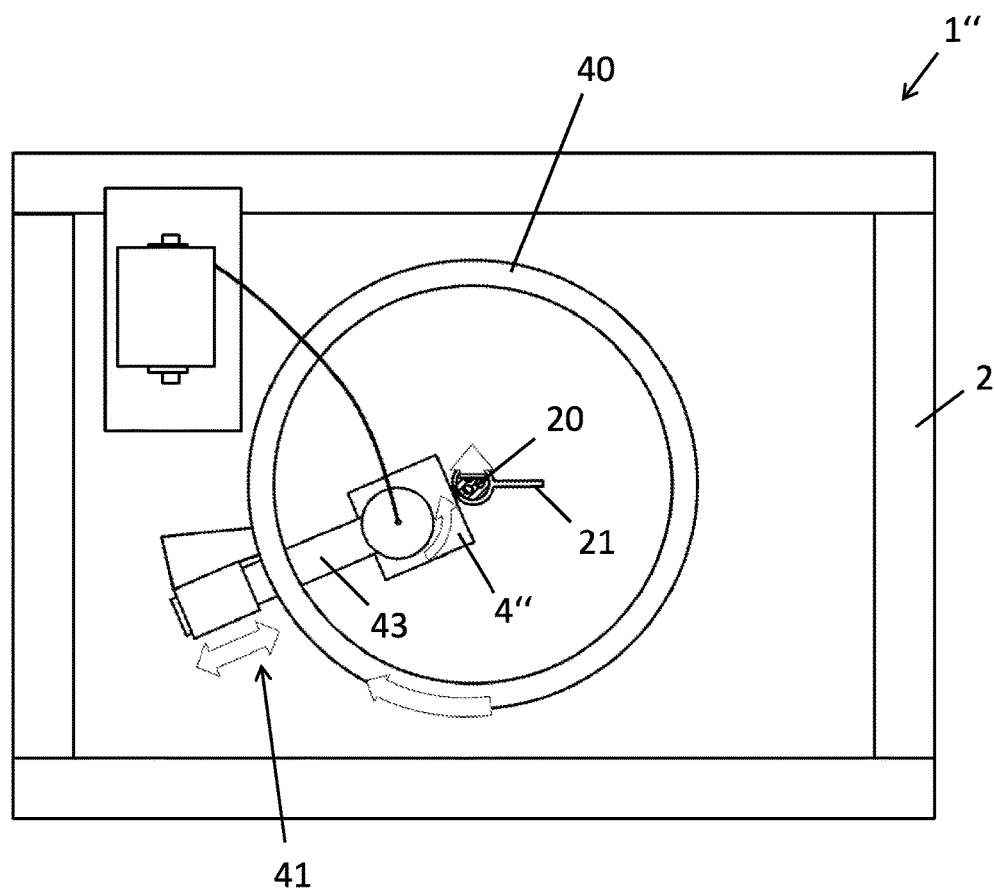
FIG. 5a shows a top view of a third embodiment of a system according to the present disclosure.

FIGS. 5a to 6b show an embodiment of a system 1" in which the dispensing head 4" is moved along a curved path around the substrate during forming at least some of the layers 23, instead of or in addition to the substrate being rotated. For this purpose, different from the preceding embodiments the dispensing head mounting arrangement comprises a guide component 40 defining a circular guide path around the substrate and a retaining component 41 retaining the dispensing head 4" and mounted to the guide component 40 to be movable in a guided manner along the circular guide path. The guide component 40 is mounted to a top of the frame 2 such that it is rotatable about an axis which is aligned with a longitudinal axis of the substrate. In FIGS. 5a and 5b the substrate is the wire 20, and the substrate mounting arrangement corresponds to the one used in FIGS. 1a and 1b with the difference that the straight portion 26 of the wire 20 extends vertically downwards through the interior space 3. The retaining component 41 is secured to the guide component 40 at a location spaced from the longitudinal axis, so that the dispensing head 4" is movable along a curved path upon rotating the guide component 40.

Figure 5B:
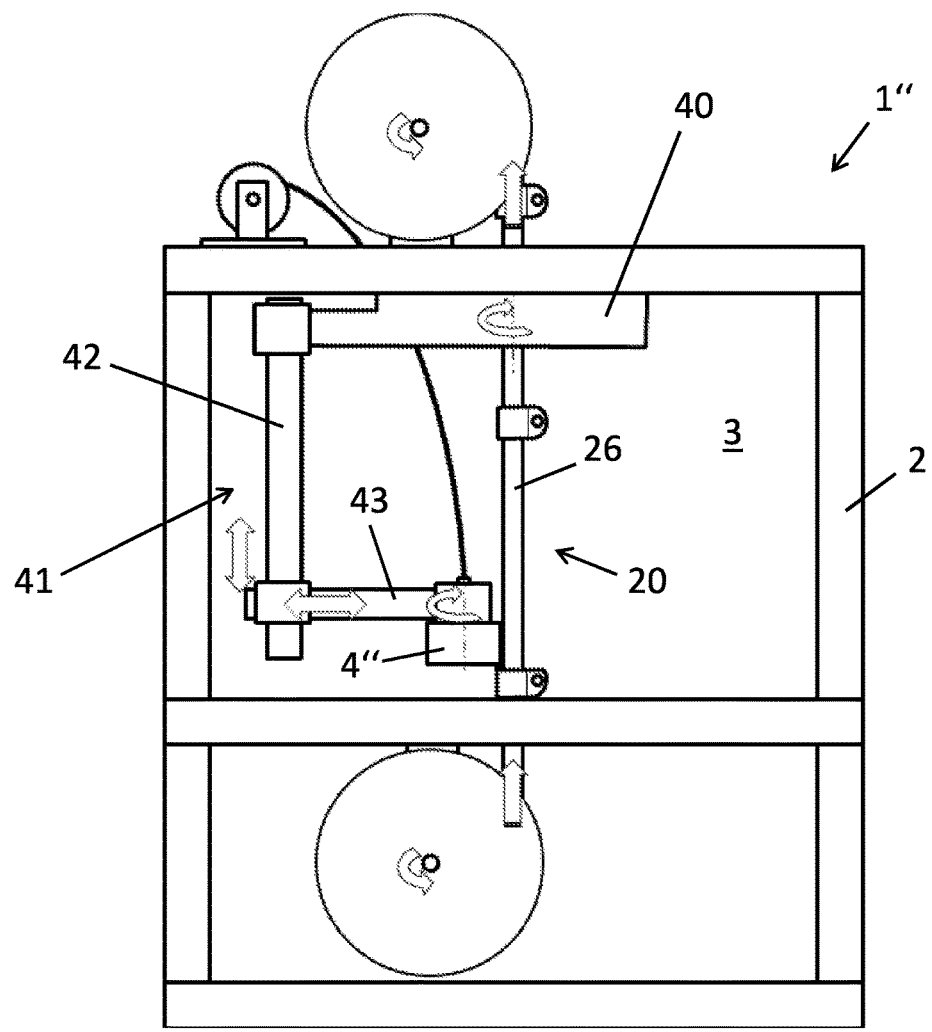

The retaining component 41 extends downwardly from the guide component 40 in FIG. 5b. More specifically, it comprises a first elongate bar-shaped element 42 which extends from the guide component 40 parallel to and spaced from the longitudinal axis of the straight portion 26 of the wire 20. Thus, upon rotating the guide component 40 the first element 42 moves along a circular path around the wire 20. The retaining component 41 further comprises a second elongate bar-shaped element 43 which is movably mounted to the first element 42 such that it extends perpendicularly to the first element 42 and can be selectively moved both along the first element 42 and along the direction of extension of the second element 43, i.e. perpendicularly to both the first element 42 and in the radial direction of the circular guide path. The dispensing head 4" is mounted to an end of the second element 43 opposite the first element 42 such that it is selectively rotatable about an axis extending parallel to and spaced from both the direction of extension of the first element 42 and the longitudinal axis of the straight portion 26 of the wire 20. The latter rotation allows for adapting the orientation of the nozzle of the dispensing head 4" to the surface of the substrate 20 to which the layers are applied. It should be noted that such adaptation is not necessary for the cylindrical wire 20 having a circular cross-sectional shape, because the orientation of the nozzle is maintained constant when moving the dispensing head 4" around the wire 20. However, for more complex surface geometries the adaptation is advantageous. The above movements of the second element 43 allow for selectively moving the dispensing head 4" in the longitudinal direction and in the radial direction.

As shown in FIGS. 6a and 6b the system 1" is capable of accommodating and processing substrates of different diameters by suitably extending and retracting the second element 43. The substrate 20" used in FIGS. 6a and 6b is a hollow cylindrical duct.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of manufacturing a three-dimensional object by additive manufacturing, the three-dimensional object comprising a three-dimensional component and the method comprising:
   providing a substrate; and
   successively forming on the substrate a plurality of layers, wherein each layer is formed in a pattern corresponding to the three-dimensional component being manufactured, wherein each layer is formed by dispensing a curable material from a nozzle of a dispensing head and subsequently curing the curable material, and wherein the dispensing head and nozzle are arranged such that the nozzle is provided in a surface portion of the dispensing head and arranged offset with respect to a center of the surface portion;
   wherein:
      the three-dimensional object comprises a combination of the substrate and the three-dimensional component, wherein the substrate has a non-planar surface portion and the three-dimensional component is formed at least in part on the non-planar surface portion such that it is fixedly secured to the substrate;
      during forming of at least one of the layers and/or between forming of at least two adjacent ones of the layers, a relative movement between the substrate and the dispensing head is effected such that, in a substrate coordinate system, the dispensing head moves along a non-linear path over the non-planar surface portion.

2. The method according to claim 1, wherein, during the relative movement between the substrate and the dispensing head, the dispensing head is moved relative to a machine coordinate system of a machine in which the method is carried out.

3. The method according to claim 1, wherein, during the relative movement between the substrate and the dispensing head, the substrate is rotated or pivoted, relative to a machine coordinate system of a machine in which the method is carried out, about an axis.

4. The method according to claim 1, wherein, during the relative movement between the substrate and the dispensing head, the dispensing head is rotated about a rotation axis to adapt a dispensing direction of the nozzle to the non-planar surface portion.

5. The method according to claim 4, wherein, during the relative movement between the substrate and the dispensing head, an orientation of the nozzle with respect to a tangent plane of the substrate at a center of a region in which the nozzle applies the material is maintained within a predetermined range.

6. The method according to claim 1, wherein, during the relative movement between the substrate and the dispensing head, a distance between the nozzle and the non-planar surface portion is maintained within a predetermined range.

7. The method according to claim 1, wherein the substrate comprises a cable, a harness, a duct, a stiffening profile, or a stringer.

8. The method according to claim 1, wherein the three-dimensional component comprises a bracket, an attachment profile, a cleat, a stabilizer, a connecting element, or an envelope seal.

9. A method of manufacturing a three-dimensional object by additive manufacturing, the three-dimensional object comprising a three-dimensional component and the method comprising:
   providing a substrate; and
   successively forming on the substrate a plurality of layers, wherein each layer is formed in a pattern corresponding to the three-dimensional component being manufactured, wherein each layer is formed by dispensing a curable material from a nozzle of a dispensing head and subsequently curing the curable material, and wherein the dispensing head and nozzle are arranged such that the nozzle is provided in a surface portion of the dispensing head and arranged offset with respect to a center of the surface portion;
   wherein:
      the three-dimensional object comprises a combination of the substrate and the three-dimensional component, wherein the substrate has a non-planar surface portion and the three-dimensional component is formed at least in part on the non-planar surface portion such that it is fixedly secured to the substrate;
      during forming of at least one of the layers and/or between forming of at least two adjacent ones of the layers, a relative movement between the substrate and the dispensing head is effected such that, in a substrate coordinate system, the dispensing head moves along a non-linear path over the non-planar surface portion; and the curable material comprises a thermoplastic or metal material.

10. The method of according to claim 9, wherein the substrate comprises a cable, a harness, a duct, a stiffening profile, or a stringer.

11. The method according to claim 9, wherein, during the relative movement between the substrate and the dispensing head, the dispensing head is moved relative to a machine coordinate system of a machine in which the method is carried out.

12. The method according to claim 9, wherein, during the relative movement between the substrate and the dispensing head, the substrate is rotated or pivoted, relative to a machine coordinate system of a machine in which the method is carried out, about an axis.

13. The method according to claim 9, wherein, during the relative movement between the substrate and the dispensing head, the dispensing head is rotated about a rotation axis to adapt a dispensing direction of the nozzle to the non-planar surface portion.

* * * * *